(12) United States Patent
Washio et al.

(10) Patent No.: US 7,946,185 B2
(45) Date of Patent: May 24, 2011

(54) CONVERTER PULSE WIDTH SHAPING CIRCUIT AND EXCESSIVE VORTEX FLOW RATE METER

(75) Inventors: Kenji Washio, Tokyo (JP); Takashi Hirose, Tokyo (JP)

(73) Assignee: Oval Corporation, Tokyo (JP)

( * ) Notice: Subject to any disclaimer, the term of this patent is extended or adjusted under 35 U.S.C. 154(b) by 250 days.

(21) Appl. No.: 12/087,368

(22) PCT Filed: Mar. 26, 2007

(86) PCT No.: PCT/JP2007/057323
§ 371 (c)(1),
(2), (4) Date: Jul. 2, 2008

(87) PCT Pub. No.: WO2007/125725
PCT Pub. Date: Nov. 8, 2007

(65) Prior Publication Data
US 2009/0078056 A1   Mar. 26, 2009

(30) Foreign Application Priority Data

Apr. 27, 2006 (JP) .................................. 2006-123883

(51) Int. Cl.
*G01F 1/32* (2006.01)
(52) U.S. Cl. .................................................. 73/861.22
(58) Field of Classification Search .............. 73/861, 73/861.18, 861.21, 861.22, 195; 702/45, 702/46; 327/113, 114, 115, 117, 174, 291, 327/551, 556, 557, 558
See application file for complete search history.

(56) References Cited

U.S. PATENT DOCUMENTS

| | | | | |
|---|---|---|---|---|
| 4,838,078 A | * | 6/1989 | Tsutsumi | .................... 73/114.35 |
| 4,934,194 A | * | 6/1990 | Itoh et al. | .................... 73/861.22 |
| 6,480,812 B1 | * | 11/2002 | Wada et al. | ..................... 702/191 |

FOREIGN PATENT DOCUMENTS

| | | | |
|---|---|---|---|
| JP | 53-14199 | | 2/1978 |
| JP | 63081213 A | * | 4/1988 |
| JP | 63-31725 | | 6/1988 |
| JP | 7-55518 | | 3/1995 |
| JP | 3144152 | | 1/2001 |
| JP | 3564111 | | 6/2004 |

OTHER PUBLICATIONS

International Search Report mailed May 22, 2007 for International Application No. PCT/JP2007/057323.

* cited by examiner

*Primary Examiner* — Ryan Johnson
(74) *Attorney, Agent, or Firm* — Wenderoth, Lind & Ponack, L.L.P.

(57) ABSTRACT

A converter pulse width shaping circuit (6) according to the present invention is provided between a waveform shaping apparatus (4) and an erroneous output preventing apparatus (5) that are provided between a flow rate detecting portion (1) and a flow rate metering mechanism (3). When high frequency pulse signals of a frequency not lower than a predetermined value are successively input, the converter pulse width shaping circuit (6) combines those high frequency pulse signals to convert them to a low frequency pulse signal, which is then output to the erroneous output preventing apparatus (5) having a low-cut function. In the present invention, a vortex flow meter is made up of a converter (2) including the converter pulse width shaping circuit (6) described above.

2 Claims, 1 Drawing Sheet

(a)

(b)

CONVERTER PULSE WIDTH SHAPING CIRCUIT AND EXCESSIVE VORTEX FLOW RATE METER

TECHNICAL FIELD

The present invention relates to a converter pulse width shaping circuit and a vortex flow meter whose converter includes this converter pulse width shaping circuit.

BACKGROUND ART

As is well known in the art, the vortex flow meter utilizes the fact that, when a vortex generator is arranged in a fluid flow, within a predetermined Reynolds number range, the number of Karman vortexes generated from the vortex generator per unit time (vortex frequency) is in proportion to the flow rate regardless of whether the fluid is gas or liquid; this constant of proportionality is called Strouhal number. As a detection sensor for the vortex, there are exemplified a thermal sensor, a distortion sensor, a photo sensor, a pressure sensor, and an ultrasonic sensor; these are capable of detecting thermal change, lift change, etc. due to a vortex. The vortex flow meter is a simple flow meter capable of measuring flow rate without being affected by the physical properties of the fluid to be measured, and is widely used for flow rate measurement of gas and fluid. In a vortex flow meter, a Karman vortex signal from a detection sensor is triggered by a trigger circuit to obtain a flow rate signal pulse.

In a flow rate measurement mechanism for a compressible fluid, even when the flow is stopped by closing a cutoff valve provided on the downstream or the upstream of a flow meter, the compressible fluid such as gas is compressed/expanded within a closed tubular path to thereby cause pulsation in the fluid. A flow rate detecting portion detects movement of the fluid to cause a signal transmitting portion connected to this flow rate detecting portion to transmit a signal, disadvantageously resulting in a state as if flow rate measurement has been performed. Apart from the noise signal due to this fluid rocking (pulsation), regardless of the compressibility of the fluid, when there is no flow rate to be measured, a noise signal such as piping vibration or electrical noise is great, and even when this noise signal exceeds a trigger level, it is allowed to be turned into a pulse as a flow rate signal to thereby hinder a normal measurement. At this time, when the vortex flow meter is provided with an alarm device, an alarm will be issued.

The above-mentioned problem is especially conspicuous in a flow meter which, as in the case of a vortex flow meter, has a wide flow rate range and detects flow rate through integration based on the flow velocity of the fluid. In a conventional flow rate measurement device, a filter is usually arranged between the flow rate detecting portion in the tubular path and a signal generator (trigger) generating a pulse signal so as to enhance the S/N ratio (signal conditioner); however, since the filter is selected so as to cover the flow rate range, the above-mentioned problem is not solved. This phenomenon constitutes no problem when the cutoff valve is being kept open to pass the compressible fluid to measure the flow rate thereof; in reality, however, the cutoff valve is kept closed almost all day long, so any pulsation of the compressible fluid in the tubular path will be measured as the flow rate. While it is possible to suppress the trigger of such noise to some degree by expanding the trigger level, expansion of the trigger level will result in restriction of the flow rate range allowing measurement.

Japanese Utility Model Examined Publication No. Sho 53-14199 discloses a technique related to an erroneous metering preventing device for preventing erroneous metering in a vortex flow meter. Further, JP 3564111 B discloses a technique related to an erroneous output preventing apparatus (which may also be referred to as erroneous metering preventing apparatus), which is an improvement over the technique as disclosed in Japanese Utility Model Examined Publication No. Sho 53-14199. The techniques disclosed in Japanese Utility Model Examined Publication No. Sho 53-14199 and JP 3564111 B have been proposed by the applicant of the present invention.

In the erroneous metering preventing apparatus disclosed in Japanese Utility Model Examined Publication No. Sho 53-14199, an accumulation counter and a timer are arranged between a signal transmitting portion connected to a flow rate detecting portion in a tubular path and transmitting pulse signals and a metering mechanism for counting the signals to meter flow rate. As a result, when the accumulation counter does not attain a set value within the set time of the timer, it means that an erroneous pulse signal, which has been generated through rocking, is to be off, and no signal is sent to the metering mechanism, which means the metering mechanism is not caused to start integration by rocking of the fluid, thus preventing erroneous measurement. In Japanese Utility Model Examined Publication No. Sho 53-14199, the signal transmitting portion of the erroneous metering preventing apparatus includes a signal conditioner equipped with a filter and a trigger.

In the erroneous metering preventing apparatus disclosed in Japanese Utility Model Examined Publication No. Sho 53-14199, as a result of the observation of the metering condition due to pulsation, attention is focused on the fact that a signal in the metering range is generated in a very short period of time, which signal exhibits a frequency not higher than the lower limit frequency when averaged over a period, for example, of approximately 10 seconds, and, by utilizing this fact, erroneous metering due to fluid rocking is prevented.

The erroneous output preventing apparatus disclosed in JP 3564111 B includes a trigger circuit that outputs pulses when a signal output from a vortex signal detection sensor of the flow rate detecting portion exceeds a predetermined trigger level, an integration circuit for integrating the pulses output from the trigger circuit, two comparators which use a signal obtained through integration by the integration circuit as an input signal and which compare the voltage of the input signal with predetermined upper limit voltage and lower limit voltage to output the comparison results in the form of pulses, a counter circuit for counting the pulses output from the trigger circuit, a logic IC to which the output pulses from the two comparators are input for logical operation and which outputs a signal related to resetting of the count value of the counter circuit, and a pulse output means which does not output the output pulses from the trigger circuit when the count value of the counter circuit is less than a predetermined value but which outputs the output pulses from the trigger circuit when the count value of the counter circuit attains the predetermined value, with a vortex flow meter computing the flow rate or the flow velocity of the fluid to be measured by using the pulses output from the pulse output means.

SUMMARY OF THE INVENTION

In the above-mentioned related-art techniques, a pulse signal of a frequency not higher than a fixed frequency is cut off (low-cut function), and only when pulses are detected successively in a number not less than a fixed number, it is determined that a flow rate signal has been issued (memory function). Thus, even in the case of a noise signal, which is not a flow rate signal, it is output to a metering mechanism for metering flow rate if it has a frequency not lower than a fixed frequency.

As is known in the art, the natural frequency of the detection sensor of a vortex flow meter is in a high frequency range. Thus, in a case in which the vortex flow meter is affected, for example, by piping vibration or the like, there is a fear of signal transmission being allowed to be effected at the natural frequency of the high frequency range of the detection sensor.

The present invention has been made in view of the above-mentioned problems. It is an object of the present invention to provide a converter pulse width shaping circuit and a vortex flow meter contributing to preventing erroneous metering (erroneous output).

A converter pulse width shaping circuit according to a first aspect of the present invention, which has been made to solve the above-mentioned problems, is provided between a waveform shaping apparatus and an erroneous output preventing apparatus that are provided between a flow rate detecting portion and a flow rate metering mechanism, and combines, when high frequency pulse signals of a frequency not lower than a predetermined value are successively input, those high frequency pulse signals to convert them to a low frequency pulse signal, which is then output to the erroneous output preventing apparatus having a low-cut function.

According to the present invention, which has the above-mentioned features, the pulse width of a pulse signal to be input to the erroneous output preventing apparatus is subjected to shaping. In performing the pulse width shaping, combination is effected such that the pulse-ON width is enlarged when pulse signals of a frequency not lower than a predetermined value are successively input from the waveform shaping apparatus; otherwise, the pulse signals from the waveform shaping apparatus are output with no combination being effected while a change in ON-width occurs. Pulse signals of a frequency not lower than a predetermined value are successively input, the high frequency pulse signals are combined to be converted to a single low frequency pulse signal. The low frequency pulse signal thus obtained through conversion are cut off as low frequency signals by the erroneous output preventing apparatus with a low-cut function. At this time, the cutting by the erroneous output preventing apparatus actually means the cutting of a high frequency pulse signal, so, when as the converter as a whole is considered, there is provided a high-cut function in addition to the low-cut function.

A converter pulse width shaping circuit according to a second aspect of the present invention, in connection with the first aspect of the present invention, further includes an apparatus connection portion detachably provided between the waveform shaping apparatus and the erroneous output preventing apparatus.

According to the present invention with the above-mentioned feature, it is possible to effect retrofitting to an existing vortex flow meter already installed. It is possible to improve the pulse width shaping circuit in terms of general versatility, and to reduce the burden on the user of the existing vortex flow meter.

The vortex flow meter according to a third aspect of the present invention, provided so as to achieve the above-mentioned object, is equipped with a converter including the converter pulse width shaping circuit according to the first or the second aspect of the present invention.

According to the present invention with the above-mentioned features, when high frequency pulse signals of a value not lower than a predetermined value are successively input from the waveform shaping apparatus to the pulse width shaping circuit, the high frequency pulse signals are combined at the pulse width shaping circuit to be converted to a single low frequency pulse signal. Further, the low frequency pulse signal thus obtained through conversion is regarded as the object of cutting and is cut off in the erroneous output preventing apparatus to which the pulse width shaping circuit is connected. Due to the pulse width shaping circuit of the present invention, the erroneous output preventing apparatus with a low-cut function also has a high-cut function.

The present invention advantageously helps to contribute to preventing erroneous metering (erroneous output).

DETAILED DESCRIPTION OF THE INVENTION

Figure 1:
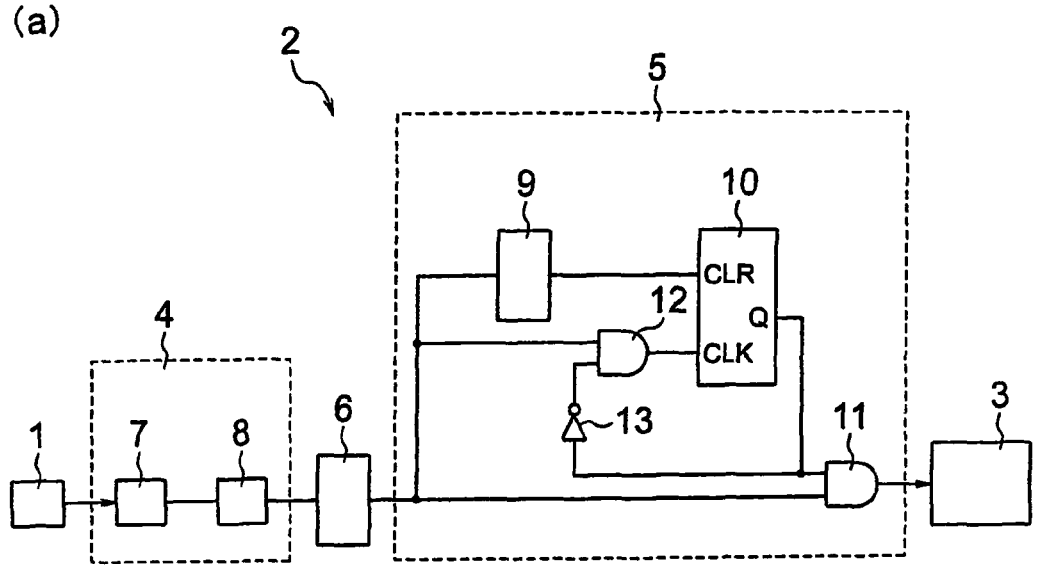
FIG. 1 is a diagram showing a converter pulse width shaping circuit and a vortex flow meter according to an embodiment of the present invention, of which portion (a) is a block diagram, and portion (b) is an operation illustrating diagram.
Figure 1:
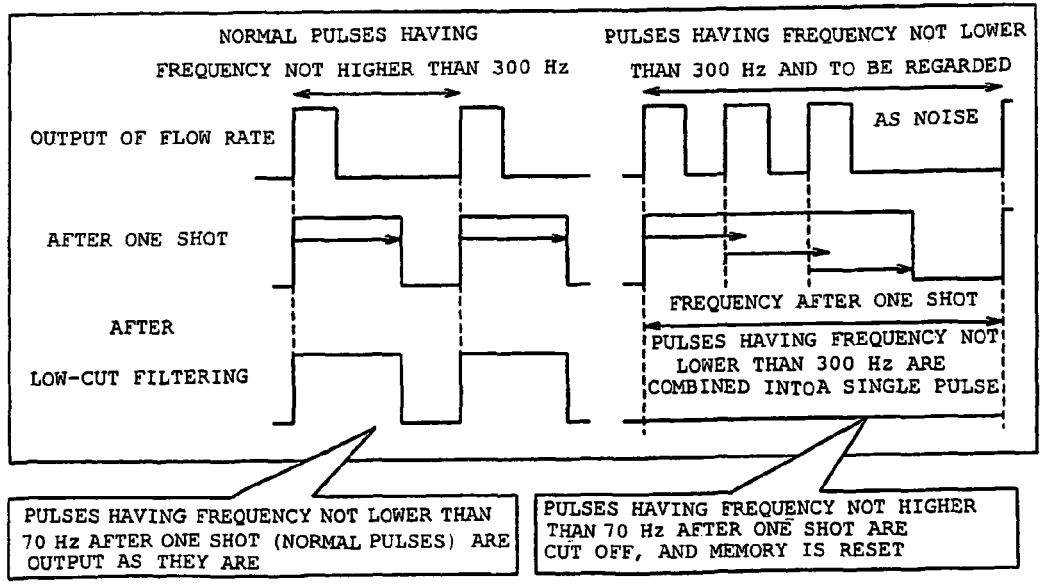

In the following, the present invention will be described with reference to the drawings. FIG. 1 is a diagram showing a converter pulse width shaping circuit and a vortex flow meter according to an embodiment of the present invention, of which portion (a) is a block diagram, and portion (b) is an operation illustrating diagram.

In FIG. 1(a), a vortex flow meter is equipped with a measurement (flow tube) tube through which a fluid to be measured circulates, a vortex generator arranged within the measurement tube so as to be opposed to the flow and generate a Karman vortex, a flow rate detecting portion (vortex signal detecting portion) 1 for detecting a signal related to the Karman vortex generated by the vortex generator, a converter 2 for converting the signal detected by the flow rate detecting portion 1 to output pulses, and a flow rate metering mechanism 3 which measures the output pulses from the converter 2 to thereby compute/measure the flow rate or the flow velocity of the fluid to be measured.

The converter 2 provided between the flow rate detecting portion 1 and the flow rate metering mechanism 3 is equipped with a waveform shaping apparatus 4 connected to the flow rate detecting portion 1, an erroneous output preventing apparatus 5 connected to the flow rate metering mechanism 3, and a pulse width shaping circuit 6 connected to the waveform shaping apparatus 4 and the erroneous output preventing apparatus 5 by being provided therebetween. While there are no particular restrictions in this regard, the pulse width shaping circuit 6 is detachably provided between the waveform shaping apparatus 4 and the erroneous output preventing apparatus 5. The pulse width shaping circuit 6 has an apparatus connecting portion for connection to each of the waveform shaping circuit 4 and the erroneous output preventing apparatus 5.

The waveform shaping apparatus 4 is equipped with a filter circuit 7 and a trigger circuit 8. The filter circuit 7 effects filtering/shaping on an alternating voltage signal amplified by an amplifier (not shown) to enhance the S/N ratio. The trigger circuit 8 outputs a pulse when a signal output from the flow rate detecting portion 1 and passed through the filter circuit 7 exceeds a predetermined trigger level.

In this embodiment, the pulse width shaping circuit 6 includes a multi-vibrator IC; when high frequency pulse signals of a frequency not lower than a predetermined value are successively input, the waveforms of the high frequency pulse signals are combined so as to enlarge the pulse-ON width to effect conversion into a single low frequency pulse signal, which can be then output to the erroneous output preventing apparatus 5. The predetermined value depends on the pulse width shaped by the multi-vibrator IC, and the specific frequency is the reciprocal thereof. Apart from its operation when there is successive input of high frequency pulse signals of a value not lower than a predetermined value, the pulse width shaping circuit 6 can effect output to the erroneous output preventing apparatus 5 while effecting no combination leading to a change in ON-width. The pulse width shaping circuit 6 has a function to shape the pulse width of pulse signals to be output to the erroneous output preventing apparatus 5. Regarding the combination of waveforms to effect conversion to a low frequency pulse signal, it will be described with reference to FIG. 1(b).

The erroneous output preventing apparatus 5 functions as a kind of memory. More specifically, it has a function to store all the pulse signals input via the pulse width shaping circuit 6 prior to the output to the flow rate metering mechanism 3. In this memory, a certain number of memory pulses is set, and no pulse is output to the exterior until the set number of pulses have been stored, outputting pulses to the exterior upon saturation of the memory. Further, the erroneous output preventing apparatus 5 has a low-cut function (low-cut filter). More specifically, when the pulse signals input via the pulse width shaping circuit 6 are of a frequency not higher than a predetermined value, it effects waveform cutting and memory resetting.

While there are no particular restrictions regarding the erroneous output preventing apparatus 5, in this embodiment, it is equipped with a timer circuit 9 including a logic IC and having a low-cut function, a counter circuit 10 in which the timer circuit 9 is connected to CLR, and AND gates 11 and 12 and a NOT gate 13 connected to the counter circuit 10 as shown in the drawing.

Next, the operation of the pulse width shaping circuit 6 and of the erroneous output preventing apparatus 5 will be described with reference to the portions (a) and (b) of FIG. 1. The values in the description are only given by way of example. Further, as can be seen from the description, pulse signals of high frequency are actually cut off, so a high frequency of a value not lower than the predetermined value will be referred to as high-cut frequency.

(1): When two or more pulses of not lower than a high-cut frequency (300 Hz) are detected successively, they are combined into a single pulse by the pulse width shaping circuit 6, with the result that a low frequency pulse is output to the erroneous output preventing apparatus 5. More specifically, in the case, for example, of a maximum flow rate as the guaranteed accuracy performance value, setting is previously made such that the pulse-ON width is approximately 50% with respect to the period, and, when pulses of a frequency not lower than the frequency to be regarded as noise (300 Hz) are input, the input pulses are combined so as to enlarge the pulse-ON width to be converted into a single low frequency pulse. The pulse obtained through the conversion is output to the erroneous output preventing apparatus 5.

In the case of normal pulses (pulses of a frequency lower than 300 Hz), no combination occurs even if the pulse-ON width becomes approximately 50% with respect to the period in the pulse width shaping circuit 6. That is, signal output to the erroneous output preventing apparatus 5 is effected in a state in which there is no combination while there is a change in ON-width.

(2): If, as a result of the operation of the above item (1), the pulse frequency is lower than the low-cut set value of the erroneous output preventing apparatus 5 (which is 70 Hz in FIG. 1(b)), the pulses are cut off by the low-cut filter of the erroneous output preventing apparatus 5. That is, no output to the flow rate metering mechanism is effected, and therefore the output pulses from the converter 2 are not measured. Thus, erroneous metering (erroneous output) is prevented.

(3): If, as a result of the operation of the above item (1), the pulse frequency is not lower than the low-cut set value of the erroneous output preventing apparatus 5 (which is 70 Hz in FIG. 1(b)), no cutting is effected by the low-cut filter of the erroneous output preventing apparatus 5, and the pulses are output as they are to the flow rate metering mechanism 3.

The present invention described above may be summarized as follows: Pulse signals whose frequency is not lower than a fixed frequency can be regarded as signals not related to flow rate. More specifically, by effecting setting previously such that the pulse-ON width is approximately 50% (for example) with respect to the period at the frequency corresponding to the maximum flow rate, it is possible to prevent output of a signal corresponding to double the maximum flow rate or more.

In the present invention, pulses that have remained uncut in the high frequency range can be cut off by the pulse width shaping circuit 6 and the erroneous output preventing apparatus 5 having a low-cut function. As compared with a conventional case in which pulses that have remained uncut in the high frequency range cannot be removed even by low-cutting, the present invention helps to mitigate over-triggering to a marked degree.

It might be possible to adopt a method in which the high frequency range is removed by a CPU or the like. However, in this case, it would be necessary to design the CPU so as to be endowed with a performance high enough to be capable of responding to high frequency, resulting in a large load, which means the method lacks feasibility. Thus, the present invention proves more useful than the method in which the high frequency range is removed by a CPU or the like.

Apart from this, the present invention naturally allows various modifications without departing from the gist of the invention.

The invention claimed is:

1. A vortex flow meter, comprising:
 a measurement tube through which a fluid to be measured circulates;
 a vortex generator arranged within the measurement tube so as to be opposed to a flow within the measurement tube, the vortex generator generating a Karman vortex;
 a flow rate detecting portion for detecting a signal related to the Karman vortex generated by the vortex generator;
 a converter for converting the signal detected by the flow rate detecting portion to output pulses; and
 a flow rate metering mechanism which measures the output pulses from the converter to thereby determine one of a flow rate and a flow velocity of the fluid to be measured,
 wherein the converter comprises
  a waveform shaping apparatus connected to the flow rate detecting portion, the waveform shaping apparatus including a filter circuit for effecting filtering/shaping on an alternating voltage signal amplified by an amplifier to enhance a S/N ratio, and a trigger circuit for outputting a pulse when the signal output from the flow rate detecting portion and passed through the filter circuit exceeds a predetermined trigger level,
  a pulse width shaping circuit including a multi-vibrator IC, the pulse width shaping circuit combining, when high frequency pulse signals of a frequency not lower than a predetermined value are successively input, waveforms of the high frequency pulse signals so as to enlarge a pulse-ON width to effect conversion into a single low frequency pulse signal, and outputting the single low frequency pulse signal, and an erroneous output preventing apparatus including
   a timer circuit including a logic IC and having a low-cut function,
   a counter circuit in which the timer circuit is connected to CLR, and
   AND gates and a NOT gate connected to the counter circuit,
   wherein the erroneous output preventing apparatus stores pulse signals output from the pulse width shaping circuit until a set number of pulses have been stored to avoid outputting the pulses to the flow rate metering mechanism, and outputs the pulses to the flow rate metering mechanism upon saturation of a memory, the erroneous output preventing apparatus effecting waveform cutting and memory resetting when the pulse signals input from the pulse width shaping circuit have a frequency not higher than a predetermined value.

2. A vortex flow meter according to claim 1, wherein the pulse width shaping circuit is detachably provided between the waveform shaping apparatus and the erroneous output preventing apparatus.

\* \* \* \* \*